United States Patent
Childress et al.

(10) Patent No.: US 7,617,307 B2
(45) Date of Patent: *Nov. 10, 2009

(54) ARCHITECTURE FOR A CENTRALIZED MANAGEMENT SYSTEM

(75) Inventors: Rhonda L. Childress, Austin, TX (US); Kenneth David Christiance, Apex, NC (US); David Bruce Kumhyr, Austin, TX (US); Michael Arthur Lamb, New Paltz, NY (US); Gregg W. Machovec, Vestal, NY (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/139,862

(22) Filed: Jun. 16, 2008

(65) Prior Publication Data

US 2008/0250134 A1 Oct. 9, 2008

Related U.S. Application Data

(63) Continuation of application No. 10/782,445, filed on Feb. 19, 2004, now Pat. No. 7,418,491.

(51) Int. Cl.
*G06F 15/16* (2006.01)
*G06F 15/173* (2006.01)
*G06F 15/177* (2006.01)

(52) U.S. Cl. .................... 709/223; 709/244; 705/7; 718/107

(58) Field of Classification Search ........... 709/223, 709/225, 244; 705/7; 718/107
See application file for complete search history.

(56) References Cited

U.S. PATENT DOCUMENTS

| | | | |
|---|---|---|---|
| 6,226,686 B1 | 5/2001 | Rothschild et al. | |
| 6,597,956 B1 | 7/2003 | Aziz et al. | |
| 6,847,619 B2 * | 1/2005 | Zscheile et al. | 370/322 |
| 6,871,232 B2 * | 3/2005 | Curie et al. | 709/225 |
| 2002/0143692 A1 | 10/2002 | Heimermann et al. | |
| 2003/0037275 A1 * | 2/2003 | Bakke et al. | 714/4 |
| 2003/0126265 A1 | 7/2003 | Aziz et al. | |
| 2003/0154270 A1 | 8/2003 | Aranda, Jr. | |
| 2003/0204855 A1 | 10/2003 | Burton et al. | |
| 2004/0055002 A1 * | 3/2004 | Das | 718/107 |
| 2004/0064351 A1 | 4/2004 | Mikurak | |

(Continued)

*Primary Examiner*—Haresh N Patel
(74) *Attorney, Agent, or Firm*—Francis Lammes; Stephen J. Walder, Jr.; William H. Steinberg (57) ABSTRACT

A mechanism is provided for integrating a user resource into a managed computing resource system. If a level of data privacy indicating a first level of dedicated computing resources, a user resource is integrated into a first logical design. Responsive to the level of data privacy indicating a second level of dedicated computing resources, the user resource is integrated into a second logical design. If there is no indication of the level of data privacy and the user resource has at least one associated unique IP address, a capacity of a point of deployment (POD) device is determined. If there is no indication of the level of data privacy and no unique IP address, the user resource is integrated into the first logical design. If the user resource utilizes a predefined percentage of the capacity, the user resource is integrated into a third logical design.

22 Claims, 7 Drawing Sheets

U.S. PATENT DOCUMENTS

2004/0205240 A1 10/2004 Childress et al.
2005/0044197 A1* 2/2005 Lai .......................... 709/223
2006/0059253 A1 3/2006 Goodman et al.

* cited by examiner

ARCHITECTURE FOR A CENTRALIZED MANAGEMENT SYSTEM

This application is a continuation of application Ser. No. 10/782,445, now U.S. Pat. No. 7,418,491, filed Feb. 19, 2004.

CROSS-REFERENCES TO RELATED APPLICATIONS, AND COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to coordinating the utilization of multiple computers, and more particularly to methods and systems of managing shared computing resources.

BACKGROUND OF THE INVENTION

The computing resources of data centers or web hosting centers need to be managed efficiently. Management decisions may be complex, and rapid changes of allocations may be required. Such computing resources may handle large numbers of transactions, with heavy network traffic, and rapid fluctuations in volume. A conventional solution is to use multiple, 3-tier management structures, with separate management structures for separate geographical regions, for example. These conventional solutions do not realize the benefits of true centralized management.

Thus there is a need for architecture, systems and methods for centralized management of computing resources.

SUMMARY OF THE INVENTION

In one illustrative embodiment, a mechanism is provided for integrating a user resource into a managed computing resource system. The illustrative embodiment determines a level of data privacy associated with a user of the user resource. The illustrative embodiment integrates the user resource into a first logical design that includes a shared regional infrastructure management (RIM) device in response to the level of data privacy indicating a first level of dedicated computing resources. In the illustrative embodiment, the shared RIM device is shared between multiple user resources. The illustrative embodiment integrates the user resource into a second logical design that includes a dedicated RIM device in response to the level of data privacy indicating a second level of dedicated computing resources. In the illustrative embodiment, the dedicated RIM device is dedicated for use only by the user resource. The illustrative embodiment determines if the user resource has at least one associated unique Internet protocol (IP) address in response to the user failing to require any level of data privacy. The illustrative embodiment integrates the user resource into the first logical design in response to the user resource failing to have the at least one associated unique IP address. The illustrative embodiment determines if the user resource utilizes a predefined percentage of a capacity of a point of deployment (POD) device in response to the user resource having the at least one associated unique IP address. The illustrative embodiment integrates the user resource into a third logical design that includes at least one shared hub, the shared RIM device, a shared spoke device, and a dedicated point of deployment (POD) device in response to the user resource utilizing the predefined percentage of the capacity of the POD device.

In another illustrative embodiment, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Application" means any specific use for computer technology, or any software that allows a specific use for computer technology.

"Availability" means ability to be accessed or used.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Service level agreement" (or "SLA") means any oral or written agreement between provider and user. For example, "service level agreement" includes but is not limited to an agreement between vendor and customer, and an agreement between an information technology department and an end user. For example, a "service level agreement" might involve one or more applications, and might include specifications regarding availability, response times or problem-solving.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
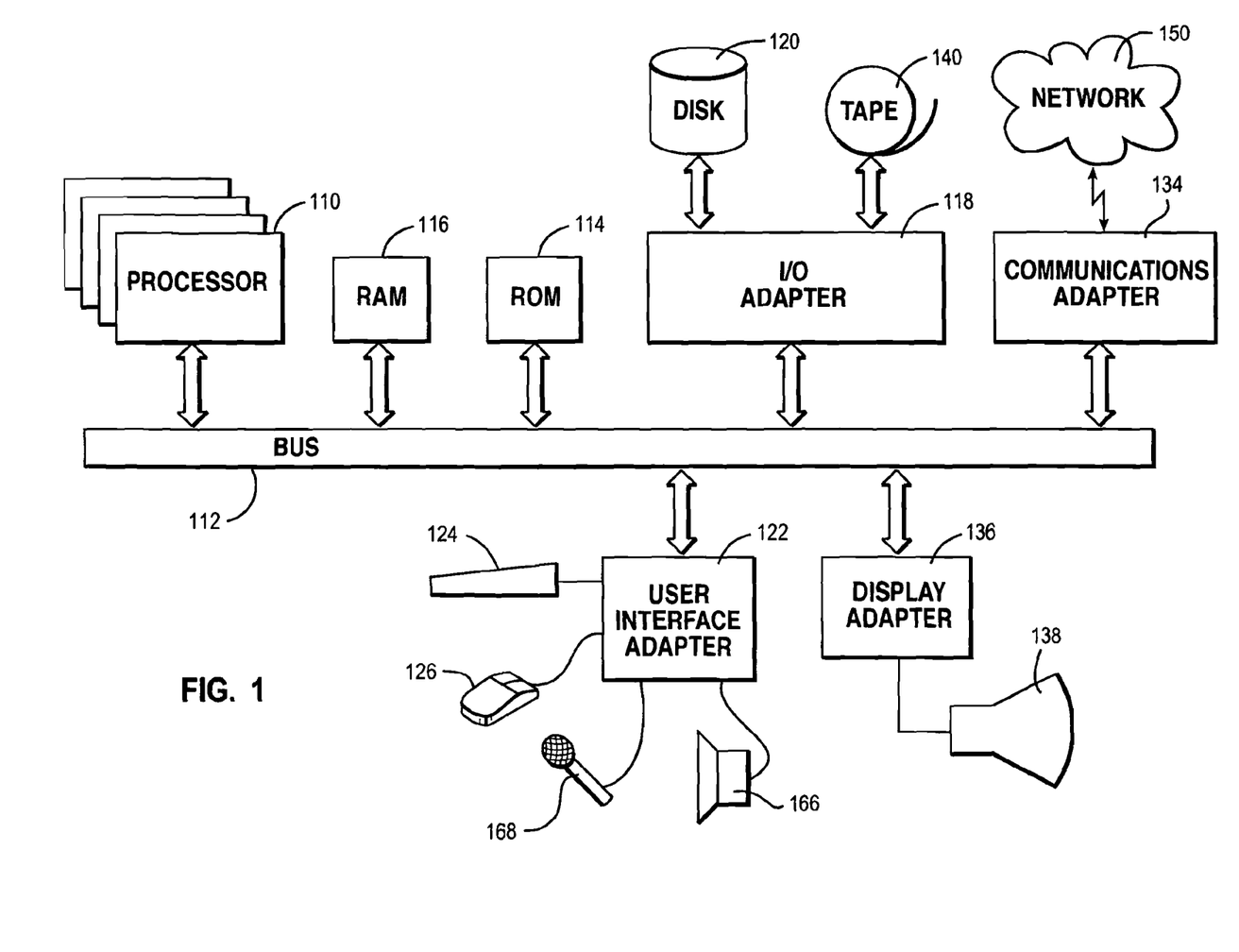
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110.

Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
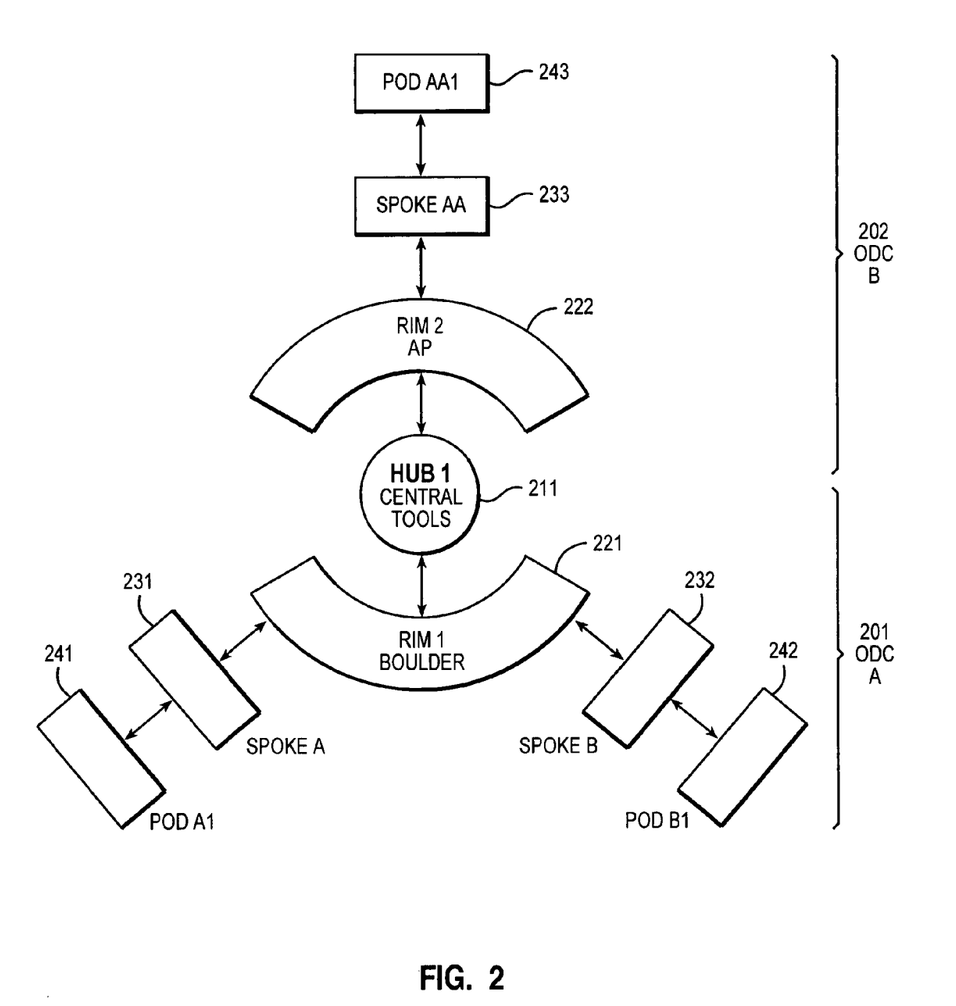
FIG. 2 is a block diagram illustrating an example of a method and system for centralized management, according to the teachings of the present invention.

FIG. 2 is a block diagram illustrating an example of a method and system for centralized management. FIG. 2 and the other examples that follow involve IBM's Universal Management Infrastructure (UMI), an architecture, set of processes and software tools, which provide a cost effective solution for managing computing resources. FIG. 2 and the other examples that follow also involve software products sold under the trademark TIVOLI by IBM.

Instances of UMI will rarely reside totally within a single data center; instead, they are leveraged by multiple data centers. The ODC (On demand Data Center) 201 or 202 is a physical location that houses the centralized environment of the delivery model. An ODC such as ODC 202 comprises a RIM 222, Spoke 233, and a PoD 243. In addition, a select set of ODC's (such as ODC 201) may contain a Hub 211. Hub 211 is a strategically located Control Center where the high level core tools reside and are managed downward. Typically, a fourth-tier TIVOLI Management Region (TMR) may reside at this location. Centralized management capabilities are performed in this tier such as Event Management, distribution of the software packages to the RIM/Spoke source hosts, and distribution of workflows to the lower tiered workflow libraries. There is no equivalent architecture layer in the Classic TIVOLI Architecture.

RIM (Regional Infrastructure Management) 221 and RIM 222 are regionally placed tools that provide management to the attached Spokes and PoDs. The RIM 221 serves an aggregator of Spoke 231 and PoD 241 management for the Hub 211 and is located at data centers, Partner sites, or large customer premises. RIM 221 and RIM 222 provide for decentralized administration that can be divided by geography, Service Delivery Center or a large account. For example, a tool formerly known as the "Hub" TIVOLI Management Region in a Classic TIVOLI Architecture may reside here in RIM 221 and RIM 222.

A Spoke such as 231, 232, or 233 is an extension of RIM tools, that provides capacity scaling. Spoke 231 can be co-located with the RIM 221, or placed on service provider (such as IBM), partner, or customer premises. Spokes are typically used for separation of duties, security policies or environments. The spoke can also be used to address scalability issues, environment issue, or legal issues such as data privacy laws. Spokes can also be a shared resource between customers. Spoke 231 leverages operational processes and support from its upper tiers: Hub 211 and RIM 221.

A PoD (Point of Deployment) such as PoDs 241, 242, and 243 are placed where the customer resources reside, and serve as the end-point for a Spoke. They provide provisioning capabilities and are used for System Management. PoDs 241, 242, and 243 can be co-located with the Spoke, or placed on service provider (such as IBM), partner, or customer premises. PoDs 241, 242, and 243 comprise the infrastructure servers, preferably located as close to customer resources as allowable. It is here that the gateways reside, along with the operating system build servers, such as the products sold under the trademark AIX NIM build servers by IBM, and products sold under the trademark SOLARIS JUMPSTART servers by SUN MICROSYSTEMS. A PoD leverages operational processes and support from its upper tiers: Hub 211, RIM 221, and spoke 231.

In the example in FIG. 2, a centralized environment is established to provide the central point of control. To this end, a four-tiered architecture is created to allow for the centralization of the UMI instances, but to still allow for flexibility in managing resources at the lower levels of the architecture. Note that not all tools can technically be enabled for centralization. Also, some corporate standards may not allow the use of centralization due to the network traffic flows and network traffic initiation (in FIG. 2, double-headed arrows symbolize communications via a network).

Preferably, the centralized environment in FIG. 2 should:
1. Adhere to the physical topology connections in the delivery network.
2. Lower the overall costs of delivery of services supplied by UMI.
3. Enable different points of control for the diversity of the delivery organizations.
4. Provide an ability to scale the infrastructure depending on customer usage.
5. View enterprise-significant events from a single location.
6. Adhere to the security constraints in the delivery network.
7. Provide consistency for software distribution packages and workflow.

The example of FIG. 2 may involve managing computing resources, for new customer outsourcing engagements, and for movement of existing outsourcing accounts to the On Demand infrastructure tool suite. Independent software vendors may utilize this framework of FIG. 2 for the development of On Demand Services (ODS), applications made accessible via a network, such that the user or application provider pays only for resources it uses, or such that resources can shrink and grow depending on the demands of the application.

In the example of FIG. 2, two features are the ability to forward system events to a centralized infrastructure from multiple UMI instances and customers, and to position the architecture for other centralization opportunities. By having a centralized view of the resources, the UMI Delivery Organizations can effectively manage utilization of resources within a UMI Instance by moving resources between pools as necessary. Also, automation in a centralized environment allows for a more consistent environment and allows for a reduction in workforce.

To summarize, the example in FIG. 2 involves means for central management [hub 211], and means for local management [including RIM's 221 and 222, spokes 231, 232, and 233, and POD's 241, 242, and 243], and means for connecting [double-headed arrows symbolize communications via a network] the means for central management, and the means for local management. FIG. 2 involves means for event management, infrastructure monitoring, service level agreement management, software distribution, and workflow distribution, to give a few examples.

Placement

Ideally perhaps, a service provider would have only one Hub 211 (with a backup) in the world. However, with geographic considerations and regulatory considerations, it is understood there will be more than one Hub in the world. Issues arise when multiple Hubs are located throughout the world, especially when customers consume resources out of multiple UMI instances.

On-Demand Services which are boarded within a PoD may need to communicate with their associated Hub for such functions as metering. If the On-Demand Service is offered across two different UMI Instances with different Hubs, information is collected independently at the separate Hubs and then is aggregated outside of the normal UMI capabilities.

There is flexibility in placement of the tiers. Placement of the UMI RIM, Spoke and PoD locations can vary for each deployment. If there are multiple Hubs for example, the Hub 211 may be designated as a master Hub to update software distribution packages and workflows.

RIM's 221 and 222 can be geographically dispersed as long as there is network connectivity to the appropriate Hub. It is also best to think of RIMs as shared resources. A RIM (such as RIM 222) should only be a dedicated resource in an extremely large environment or when a contract dictates. The use of a dedicated RIM raises delivery costs and it usually limits the scalability of the tiers from the RIM downwards. Typically the RIM's will not be co-located with Hubs because the intent is for RIM's to be geographically dispersed. There is at least one RIM per Hub.

Spokes 231, 232, and 233 can be placed either on customer or service provider (such as IBM) premises. If Spokes are placed on service provider premises, they can be placed either with the RIM or geographically separate from the RIM. If the Spoke is placed on a customer premise the Spoke is designated a dedicated Spoke. There is at least one Spoke per RIM.

Preferably, PoD's 241, 242, and 243 should be located with the servers and resource pools they are managing. The location of the PoD with the server and resource pools is preferable, because of the network traffic the gateways generate, the network protocols used by the Operating System build servers, and security reasons. If the PoD is located on UMI customer premise then it is designated a dedicated PoD and preferably should not be shared with any other UMI customer. This would not preclude a UMI customer from servicing a number of their customers in the PoD. There is at least one PoD per Spoke. A PoD preferably is connected to a single Spoke.

Hubs can be added at a later date to reduce the initial investment. For example, the initial stages of the UMI may have a single Hub such as Hub 211 that can be leveraged by the other regions. For example, if it is cost prohibitive to initially deploy a Hub for the Asia Pacific (AP) region, Asia Pacific region can use America's Hub 211 at first. A RIM such as RIM 221 may also be shared to constrain initial costs. Later, when Asia Pacific region deploys their RIM 222, their Spokes such as spoke 233 can then be moved to the new RIM 222.

Figure 3A:
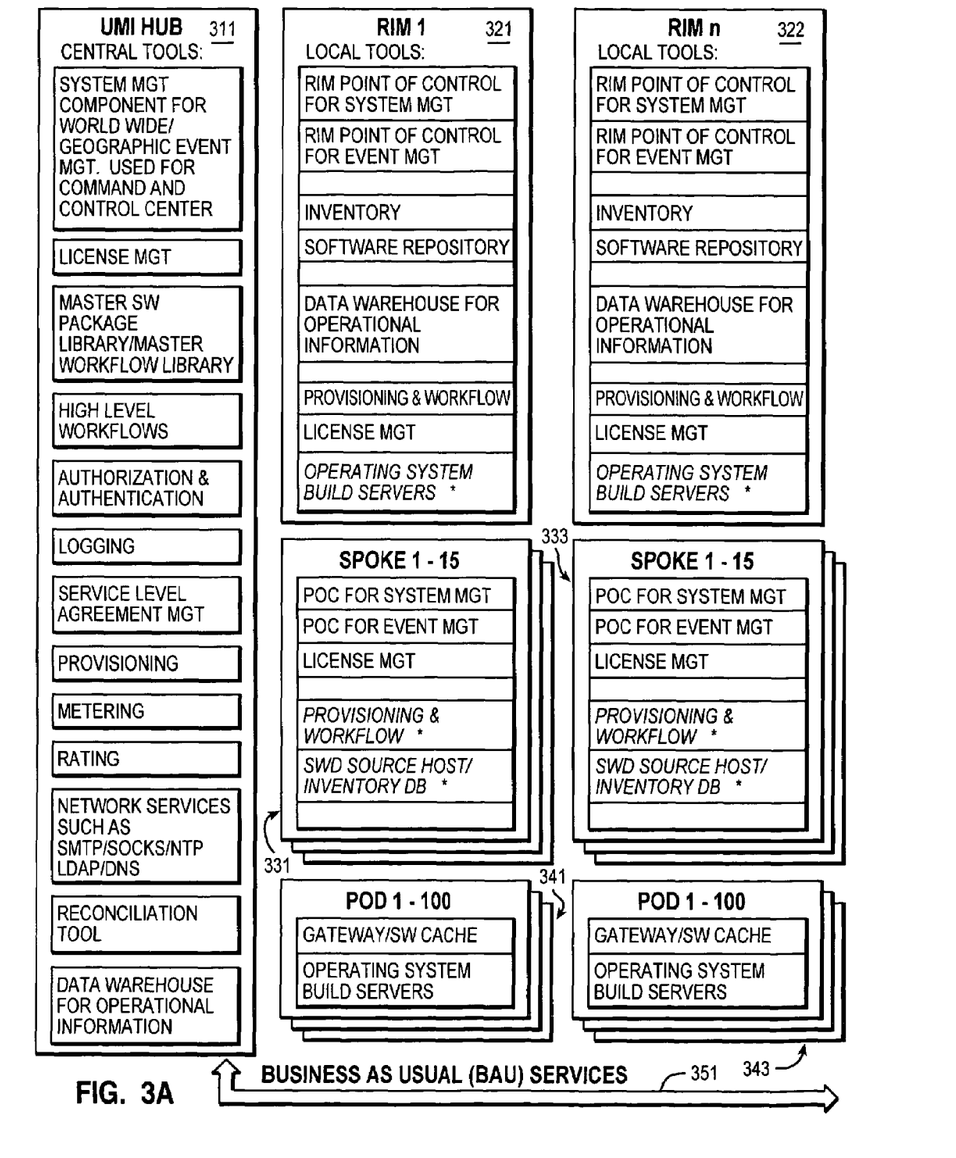
FIG. 3A is a block diagram illustrating another example of a method and system for centralized management.

FIG. 3A is a block diagram illustrating another example of a method and system for centralized management. The example in FIG. 3A shows the integration of centralized components with the UMI Architecture. The components named with italicized lettering and asterisk are optional components in that tier of the architecture. These items are not meant to indicate physical servers or server counts, but rather functionality.

The Hub 311 enables full centralized event management by providing a view across all the RIM's (RIM 321 is labeled "RIM 1" and RIM 322 is labeled "RIM n" to show that there may be any number of RIM's, labeled 1-n.) Hub 311 receives enterprise-significant events from all the RIMS. Hub 311 allows for centralized workflow and software package distribution. Workflow is a sequence of steps or transitions that are carried out in a controlled, ordered fashion to achieve a desired outcome. Master Workflow library is a repository of all the workflows that the levels below will have; it helps to facilitate a single image of the workflow. High level workflows are workflows that facilitate conversations between tiers and components. Hub 311 is the authoritative source of the Workflow Library, and is the authoritative source of the Software Package Library.

Regarding service level agreement management, SLA terms may include thresholds such as a peak number of requests per hour that must receive a response, and a required response time. A basic number of requests per hour may be specified, and when that number is exceeded, a customer may pay a premium for responses. Another possible threshold is a maximum time in which to fix a service outage. There may be monetary penalties imposed on service providers for violating these thresholds. Preferably, service level agreement terms are understandable by humans (service providers and customers) and readable by machines. SLA terms may be contained in an XML document for example.

Provisioning is the process of installing and customizing a resource into a desired end configuration or state (a resource is a server, switch, software, etc). Metering capability allows an application to monitor usage. Certain parts of the application can be monitored to produce usage and profiling information. Usage information can be fed to a billing system to bill subscribers for usage of the application. An application may communicate through web services to interact with IBM's metering service, for example. Rating means that the system manages the reports on the assembly and calculation of charges, discounts, and applicable taxes for customer invoicing. Central tools include network services such as: DNS, NTP, SMTP, and LDAP. A Reconciliation Tool reconciles the expected state for hardware and software vs the actual state. Alternative locations for a Reconciliation Tool are in a RIM or in a spoke. A data warehouse for operational information is the database that stores all the information the tools gather, concerning performance, events, etc. Besides the Hub location, Alternative locations for license management are in a RIM or in a spoke.

RIM's, symbolized by RIM 321 and RIM 322, are the centralized point of administration for the data center, large sites, or partner sites for functions such as:
Event Management
Software Distribution
Monitoring
License Administration.

Spokes, symbolized by multiple spokes at 331 and 333, are the delegated point of administration for the RIM for functions such as:
Event Management
Software Distribution (this is optional, shown by the label "SWD Source Host" with asterisk)
Monitoring
License Management
TIVOLI Data Warehouse.

PoD's, symbolized by multiple PoD's at 341 and 343, may for example provide network-distributed functions such as Software Distribution (shown by the label "Gateway/SW Cache.") Software Distribution is dependent on gateway functions, performed by the gateway/software depot server, for example. A gateway provides the communication point between the management tools and the target servers. A Software Cache is the software that could be distributed to the target servers in the POD. It helps conserve network bandwidth between the upper tiers and the PoD at 341 and 343.

Regarding operating system build servers, PoD 341 will for example deploy the build servers for the hardware platforms that are provisioned in this PoD. Build servers are for building operating system (OS) images.

Continued use of pre-existing management tools is allowed. The four tiers of the UMI, symbolized by blocks 311-343, integrate well with preexisting services, symbolized by Business As Usual (BAU) services, arrow 351. For example, a preexisting help desk service may tunnel communications through Hub 311 and RIM 321, and still operate after deployment of the four tiers of the UMI.

Figure 3B:
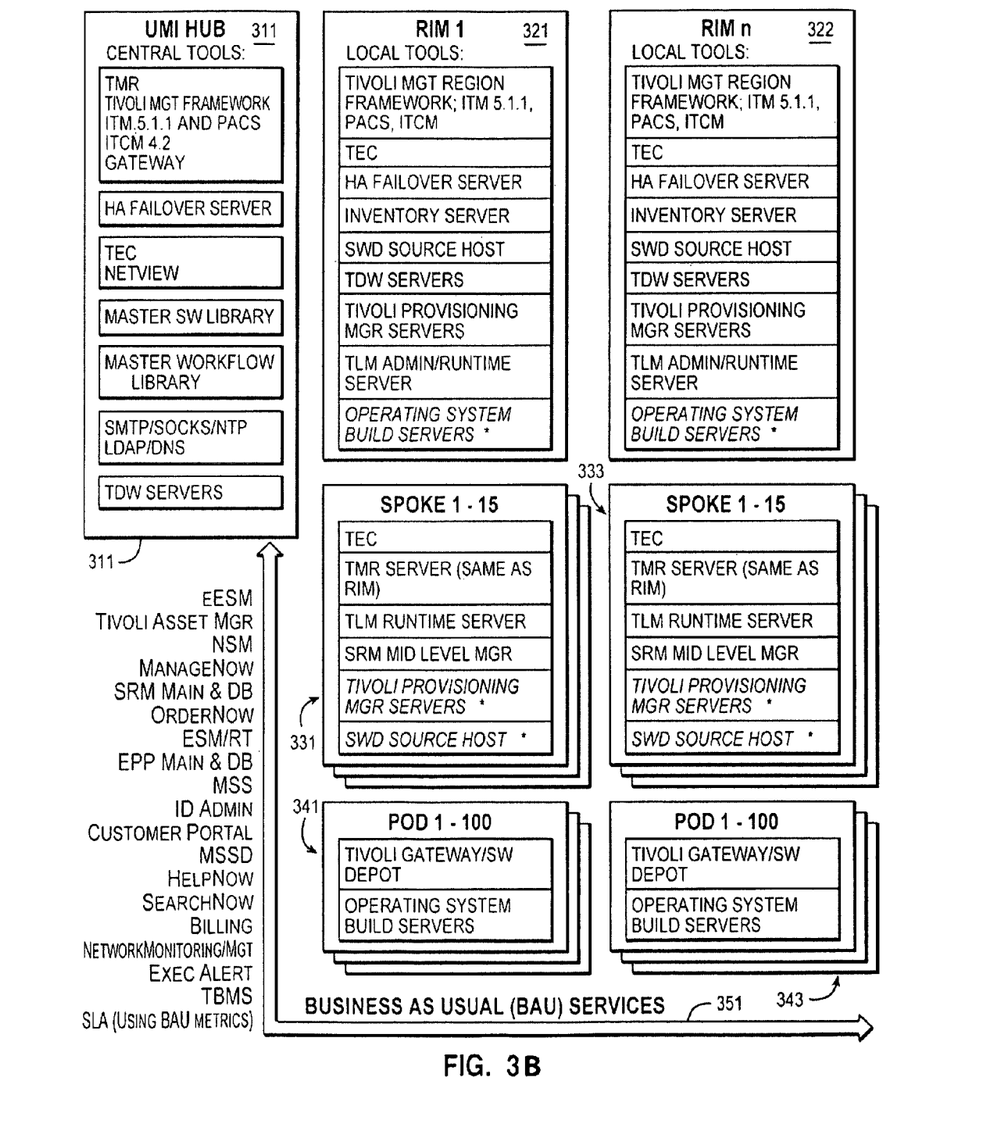
FIG. 3B is a block diagram illustrating another example of a method and system for centralized management, including a tools deployment layout.

FIG. 3B is a block diagram illustrating another example of a method and system for centralized management, including a tools deployment layout. The composition of the tools varies in each tier depending on the functions served out of that tier. Functions may be consolidated on servers, where it makes sense for cost reasons, so that it does not affect the performance of the application. FIG. 3B gives detailed examples of the tools in each of the tiers, in both shared and dedicated scenarios. The examples involve software products sold under the trademark TIVOLI by IBM.

Hub 311 offers centralization for TIVOLI Enterprise Console (TEC) events and Software Distribution Library (Master Source Library). HUB 311 may include:
TIVOLI Enterprise Console (TEC) and TIVOLI Management Region (TMR) in a high availability (HA) cluster (high availability (HA) failover.).
TIVOLI Data Warehouse (TDW).
LDAP Server that can be used for User Authentication for any UMI tool.
A Pair of NetView servers for monitoring the infrastructure servers for Node Up/Down.
DNS servers at this tier for name resolution of UMI infrastructure servers.

RIM 321 may include for example:
TIVOLI Enterprise Console (TEC) and TIVOLI Management Region (TMR) in a high availability (HA) cluster.
TIVOLI Data Warehouse (TDW).
Provisioning: TIVOLI Intelligent Orchestrator (TIO) database for customer servers.
TIO's workflow engine is the heart of the UMI provisioning component. For automation, TIO sends commands to resources. For example, a TIVOLI Configuration Manager application can be deployed onto an existing server, or a firewall port can be modified, in automated processes.
Source Host receives software from the Hub Master Software Library.
Dedicated Spoke 331 may include for example:
Tools layer replicated from the RIM layer as this is a dedicated Spoke and should have all tools at this layer to serve the required function. This is a more expensive solution as the full suite of RIM tools is also replicated here to the Spoke.
TIVOLI Data Warehouse (TDW) and TIO database are for customer servers.
TIVOLI Enterprise Console (TEC) and TIVOLI Management Region (TMR) in a high availability (HA) cluster.
TIVOLI License Manager (TLM) database has data for customer servers.
Source host is optional at this level.
Shared spoke 333 may have a smaller toolset footprint than the Dedicated Spoke.
TIVOLI Data Warehouse (TDW) and TIVOLI License Manager (TLM) database for customer servers.
Optionally, TIVOLI Enterprise Console (TEC) and TIVOLI Management Region (TMR) can be placed in a high availability (HA) cluster.
Source host function is optional at this level; it can be installed on the TIVOLI Management Region (TMR) server if required to avoid an additional box
PoD 341: A pair of gateways exists at this tier. These serve as the preferred gateways for the customer servers.
There is no difference in tools between Shared and Dedicated PoDs.
PoD 341 will for example deploy the build servers for the hardware platforms that are provisioned in this PoD. Concerning Provisioning build servers, UMI provides multiple build servers for building operating system (OS) images. For UNIX platforms, there is one physical server for each OS image. For products sold under the trademark AIX by IBM, there is the NIM server, for building AIX images. For products sold under the trademarks SOLARIS and JUMPSTART by Sun Microsystems Inc., there is the JUMPSTART server for SOLARIS images. For products sold under the trademarks HP-UX and IGNITE-UX by Hewlett Packard, there is the IGNITE-UX server for HP-UX images.

For products sold under the trademarks WINDOWS by Microsoft Corp., two applications are required—IBM Director and IBM Remote Deployment Manager (RDM), for WINDOWS Server images. RDM is an extension to IBM Director, is installed in an IBM Director environment, and adds tools for configuring and deploying servers. While RDM performs WINDOWS installations, IBM Director monitors IBM XSERIES BLADECENTER servers. Depending on the UMI deployment, one or more of these build servers would be deployed at the PoD.

Arrow 351 symbolizes continued use of pre-existing management tools. The four tiers of the UMI, symbolized by blocks 311-343, integrate well with preexisting services, symbolized by Business As Usual (BAU) services, arrow 351. In addition to the four tiers of the UMI, the following are examples of Business As Usual tools that may be available:

e-ESM: e-ESM is a suite of processes and tools developed to support four IBM Global Services customer service center (help desk) related disciplines: call, problem, change, and asset management.

NSM is a gateway that allows problem tickets to be opened through a command line interface. This tool is mainly used to integrate event management with problem management.

ManageNow is a Web interface that provides functionality for e-ESM administrators, such as call, problem, and change.

SRM: Server Resource Management is an IBM Global Services Web application that reports historical trends of key server resources (such as CPU, Memory, and Disk) in support of Service Delivery Center (data center), e-business Hosting (e-bH) and Integrated Technology Services (ITS) customers worldwide.

OrderNow: application providing a front-end requisition system with links to a back-office process ESM/RT: Enterprise Systems Management/Reporting Technology.

EPP: The End-to-End Probe Platform (EPP) interacts with server based applications and gathers performance and quality of service measurements that reflect the experience of end users. End-to-end probe Platform (EPP)'s defining feature is that it conducts and measures end user transactions without requiring any modification to the application or the network. Because transactions generated by End-to-end probe Platform probes use the same protocol stack, traverse the same network paths, and interact with servers in the same way as those created by real users, End-to-end probe Platform data realistically reflects the end user experience in all these areas.

MSS: Managed Storage Services (MSS) is IBM's offering in the Storage Service Provider (SSP) market. It is based upon industry-standard Storage Area Network (SAN) and Network Attached Storage (NAS) technologies. MSS is composed of a set of base services and separately priced premium options. All storage is centrally managed by a single Storage Operations Center (SOC), with a backup SOC in place to address business continuity requirements.

HelpNow! ID Administration is an automated user ID management tool targeted towards end users and system administrators.

Customer Portal: The IBM Services Connection portal provides a single customer facing portal for the delivery of IGS services using the Web.

IBM Global Services Managed Security Services Delivery (MSSD) offers security services to support the run phase of security operations for a customer.

HelpNow!: HelpNow! is a customizable Web-based portal providing end users with self-service, self-help, and information resources to assist in solving information technology (IT) problems quickly and cost-effectively.

SearchNow!: provides Web-based search capabilities for help desk agents to search knowledge bases.

Usage-Based Billing: Version 5 of the Universal Server Farm Architecture offers usage-based billing of customers' Internet access bandwidth usage and delivery of customer measurements in the form of online reports and graphs.

Network Monitoring/Management: Network Management is the practice of monitoring and controlling an existing network so that the network stays up and running to meet the expectations of the network users. In addition, network management allows for planning to include the modifications and the new network elements required to meet increasing demand without interfering with existing operations.

TBMS: enables customers to graphically monitor and control interconnected business components and operating system resources from a single console and give business context to management decisions. It helps customers manage business systems by understanding and managing the dependencies between business systems components and their underlying infrastructure.

Service level agreement (SLA) management, using BAU metrics, may also be involved in FIG. 3B, at arrow 351.

Figure 4:
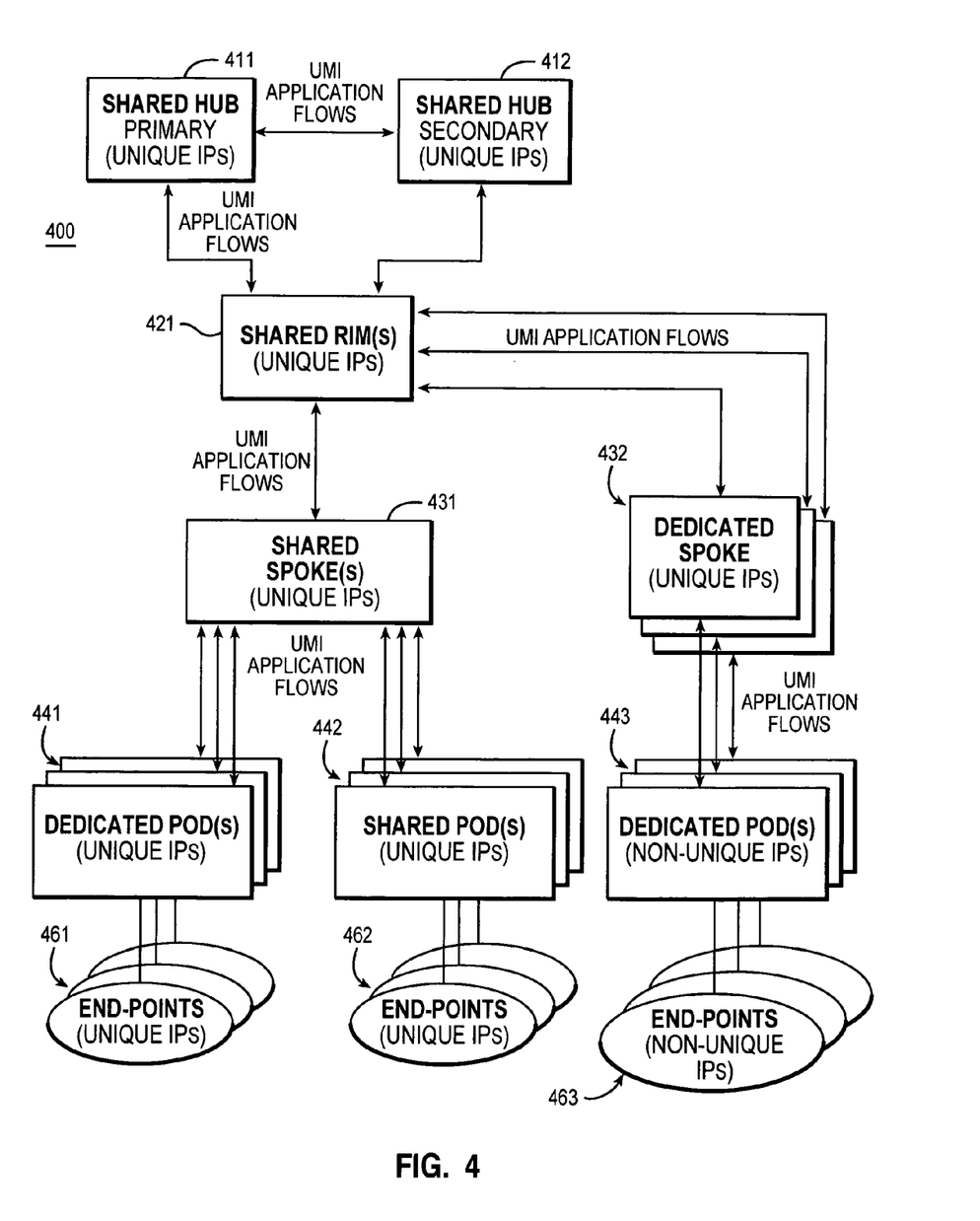
FIG. 4 is a block diagram showing communication flow, and illustrating another example of a method and system of managing computing resources in a network.

FIG. 4 is a block diagram showing communication flow, and illustrating another example of a method and system of managing computing resources in a network. UMI application flows are symbolized by double-headed arrows in FIG. 4. This diagram may be used to consider examples of management functions, and logical layouts.

FIG. 4 illustrates providing a logical design, including
    at least one hub containing central management tools; and
    a plurality of lower tiers containing local management tools;

placing components according to said design; and providing, from said hub, one or more functions chosen from
    event management,
    infrastructure monitoring,
    license management,
    software distribution,
    workflow distribution,
    logging,
    service level agreement management,
    provisioning,
    metering,
    rating, and
    reconciliation;

wherein said plurality of lower tiers includes one or more elements chosen from
    RIM's,
    spokes, and
    POD's.

Consider some examples of management functions. Providing software distribution involves providing a hub master software package library in the hub 411; providing a RIM software repository in the RIM 421; providing a POD software cache in the POD 441; distributing software from a hub master software package library in the hub 411; receiving the software in said RIM software repository, from said hub master software package library in the hub 411; and receiving the software in said POD 441's software cache, from said RIM software repository in the RIM 421. The software is installed in the customer computing resources at end-points 461, from the software cache in the POD 441.

Some cases may involve providing a spoke software distribution host in the spoke 431. In case of a RIM failure, software distribution may be initiated from said spoke software distribution host in the spoke 431. Such an example involves receiving said software in said POD 441's software cache, from said spoke software distribution host.

Another example of management function is an availability—monitoring solution for customer computing resources at end-points 461, 462, or 463. There are two types of End-to-end probe Platform (EPP) probes used: front-end and back-end (BE) probes. The front-end probes are located outside of UMI at various Internet locations polling URL sites over the Internet. The back-end probes are on the internal management network where UMI runs. The front-end probes are used for both service level agreement (SLA) purposes and alerting of outages; the back-end probes are used only for alerting of outages. The front-end probe system consists of multiple probes polling the same URL. The results of the probes are stored in a database in Boulder from which it is later extracted and sent to UMI for service level agreement management calculations. When an End-to-end probe Platform (EPP) front-end probe detects that a site is unavailable at end-points 461, 462, or 463, it sends an e-mail event to the Rim 421 TIVOLI Enterprise Console (TEC) managing that UMI. When the site recovers, End-to-end probe Platform (EPP) sends a clearing e-mail event. When two or more End-to-end probe Platform (EPP) probes report a URL unavailable, the Rim 421 TIVOLI Enterprise Console (TEC) forwards the alerts to the Hub 411 TIVOLI Enterprise Console (TEC) where it can be ticketed and begin the notification process.

When a back-end probe detects a problem at end-points 461, 462, or 463, it sends the TIVOLI Enterprise Console (TEC) event to the Rim 421 TIVOLI Enterprise Console (TEC) directly via a TIVOLI postemsg. When a front-end probe detects a problem, it sends a specially formatted e-mail to the alias e-mail address for the correct Rim 421 TIVOLI Enterprise Console (TEC). The alias e-mail address is a mailbox on the inbound SMTP server in Version 5 of the Universal Server Farm Architecture. A TIVOLI Enterprise Console (TEC) e-mail gateway process runs on the SMTP servers monitoring the local mailbox. The special TIVOLI Enterprise Console (TEC) e-mail gateway is a Perl script running on an inbound SMTP server that monitors the inbox for a particular user ID.

Continuing with details of FIG. 4, consider Event Management and monitoring as an example of management functions. A Common Logging and Audit (CLA) component is located in a Hub 411 and resides on one AIX server. The CLA server utilizes software products sold under the trademarks WEBSPHERE MQ, WEBSPHERE APPLICATION SERVER, and DB2, by IBM. CLA consists of two parts: the CLA server and a CLA JAVA routine (a JAR file) that is provided to the UMI components that use CLA to enable them to call CLA services. For example, the Metering component used this JAR file to enable it to communicate to the CLA server to post log messages. The CLA routine can also recognize some log messages as critical thus requiring operator notification. When the CLA routine is called with a critical message, a message is written to the local system event log on that server. A TIVOLI log file adapter watching the local system event log picks that message up and processes it as an event needing notification. The record is sent to the TIVOLI Enterprise Console (TEC) and the notification process is made. This permits components that wish to perform a notification to do so by writing to the CLA—which, in turn, writes to the local system log. API communication from a component using the CLA JAR file to the CLA server is through message-oriented middleware (such as software products sold under the trademark MQSERIES by IBM).

UMI Logical Layout

FIGS. 2-4 illustrate a consistent and cost effective solution using centralization and simplicity in the placement of tools. Preferably, most customers' situations will fit into this cost effective centralized model. On the other hand, there are some unique customer requirements that may entail a custom solution.

Customer Uniqueness

The following key factors influence from which logical model the customer is served:

When the customer has a unique security, data privacy, regulatory, or legal requirement, so that the resources preferably should not be shared.

When the customer has a Strategic Outsourcing or e-business hosting arrangement.

When the customer has unique IPs.

When the scope of the account (for example, the number of managed servers) is large enough (from a cost structure) to need a dedicated management infrastructure.

When the customer servers are already in, or are willing to move to, an a service provider (such as IBM) managed location.

When there is a separation of duty (for example, managed by different geographic groups).

Based on the results of the above analysis, a determination is made as to which Logical Model the customer best fits.

Logical Drawing

Depending on the previous analysis, the customer may be set up on one of the following Logical Layouts:

Shared outsourcing and an e-business hosting PoD with a Shared Spoke

Dedicated outsourcing and an e-business hosting PoD with a Shared Spoke

Dedicated outsourcing and an e-business hosting PoD with a Dedicated Spoke

FIG. 4 illustrates how the different tiers tie together in each of these situations, and illustrates:

The Hub 411 is always shared across multiple customers.

The Rim 421 is typically shared across multiple customers.

The Spoke can either be Shared (431) or Dedicated (432) depending on the situation.

Hub 411, Rim 421 and Spoke infrastructures have Unique IP addresses that a service provider (such as IBM) provides.

The PoD can be Shared (442) or Dedicated (441 or 443) depending on the situation.

For Shared PoD's 442, the IP addresses of the managed resources are unique.

Non-unique IP addresses of the managed resources at 463 require a dedicated PoD 443 and Spoke 432.

There may be other iterations of this architecture driven by varying customer requirements.

Customer Logical Solution Options

The options vary from Fully Dedicated to Fully Shared. The Fully Dedicated option offers the customer the most flexibility, but it is also the most expensive solution. The Fully Shared option provides the customer with the least expensive solution but requires the most standardization. The wide spectrum of options is described in more detail as follows. The options start with the most expensive (most flexibility) and go down to the most economical (most standard).

Fully Dedicated:

With this option (not shown in FIG. 4), the customer's own RIM, Spokes and PoDs are managed exclusively for them in an isolated mode. In this scenario, this becomes a three-tier model (since the Hub and RIM tiers are combined into the RIM tier) and does not connect to the UMI Hub. Since the infrastructure is provided exclusively for the customer, this is the most expensive solution but, it also provides the most flexible IT services. This option should only be chosen in rare cases when the customer does not fit into any of the shared models.

Multi-Spoke, RIM Dedicated:

With this option (not shown in FIG. 4), the customer has their own Dedicated RIM (for centralization) and multiple Spokes. Everything from the RIM down to the PoDs is managed exclusively for the customer. In this scenario the customer uses the Shared UMI Hub.

In this option, the choice for a Dedicated RIM is related to infrastructure efficiencies in the toolset. The standard Dedicated Spoke requires dedication of tools at the Spoke Layer (such as NetView and TIO). If the customer has multiple Spokes then efficiencies can be realized by moving these tools to the Dedicated RIM, thus reducing the number of instances of these tools.

Single Spoke Dedicated (432):

With this option, the customer has their own Dedicated Spoke 432. Everything from the Spoke down to the PoD's 443 is managed exclusively for the customer. In this scenario the customer uses the Shared RIM 421 and Shared UMI Hub.

The standard Dedicated Spoke requires dedication of tools at the Spoke Layer (such as NetView and TIO) due to the network inability to handle non-unique IPs, or customer requirements to provide separation in the tooling.

PoD Dedicated (441):

With this option, the customer has their own Dedicated PoD 441. In this scenario the customer uses a Shared Spoke, Shared RIM, and the Shared UMI Hub.

This situation could be realized for both the outsourcing and e-business hosting PoDs.

The customer will have Unique IP's because of the Shared Spoke 431.

Fully Shared:

With this option, the customer has everything shared down to the PoD's (442). In this scenario the customer should move their applications (462) into service provider's (such as IBM) floor space. This situation could be realized for both the outsourcing and e-business hosting PoDs. Since the infrastructure is shared with other customers, this is the most economical solution for the customer and also provides them with more standardization. This solution is highly recommended.

Figure 5:
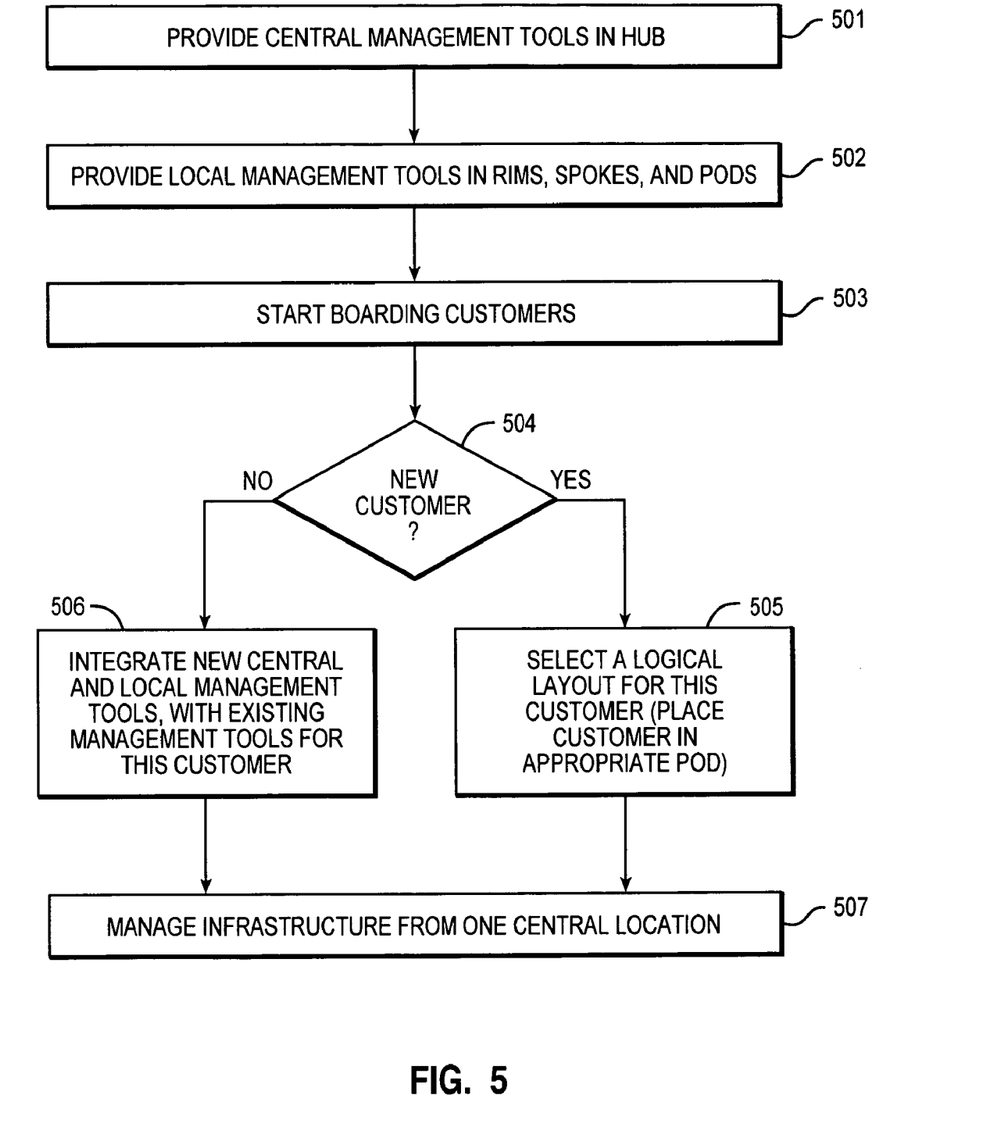
FIG. 5 is a flow chart, illustrating an example of a method of managing computing resources in a network.

FIG. 5 is a flow chart, illustrating an example of a method of managing computing resources in a network. FIG. 5 gives a high-level view of a method of deploying and using centralized management. Block 501 symbolizes providing central management tools in hub, and Block 502 symbolizes providing local management tools in rims, spokes, and pods, as discussed above. 503 symbolizes starting to serve customers, using centralized management.

Decision diamond 504 symbolizes the question of whether this particular customer is a new customer. If "Yes," branch to 505. 505 symbolizes selecting a logical layout for this customer (place customer in appropriate pod). If "No" branch to 506. 506 symbolizes integrating new central and local management tools, with existing management tools for this customer. In the case of a pre-existing customer, the solution is a combination of pre-existing management infrastructure and UMI infrastructure, depending on the specifics of the customer environment. For example, infrastructure servers are assumed to have existing policies for monitoring. These would be done BAU. The UMI Endpoints are monitored for availability as part of existing data center normal monitoring practice. This includes NetView up/down monitoring and Endpoint health. Events from availability monitoring and operating system monitoring are sent to the Endpoint's managing TIVOLI Enterprise Console (TEC). The TIVOLI Enterprise Console (TEC) will forward the events to the UMI and Account TIVOLI Enterprise Console (TEC)s.

Concerning Block 505, details of selecting a logical layout for this customer are discussed below, in connection with FIG. 6.

Figure 6:
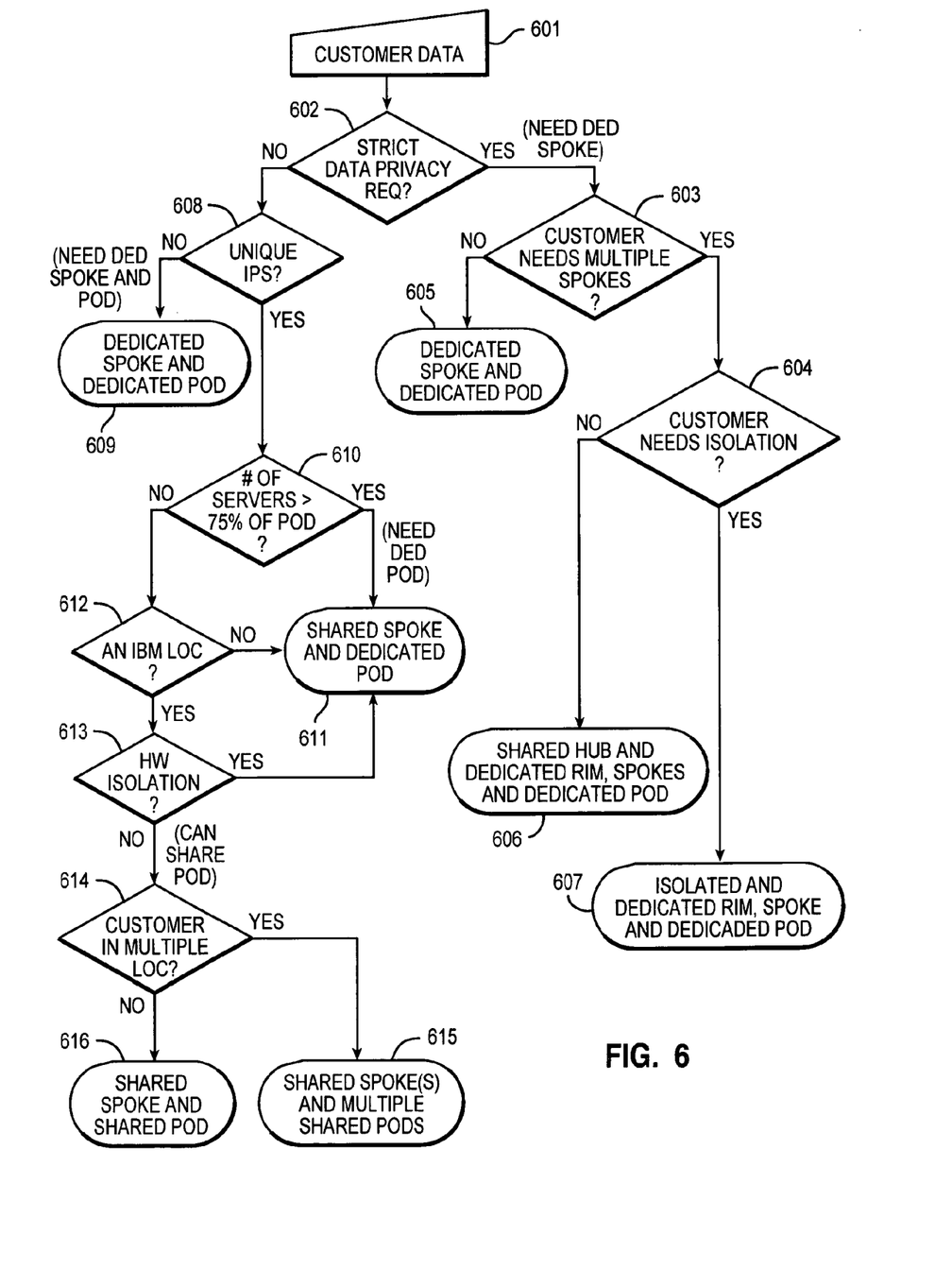
FIG. 6 is a flowchart that illustrates an example of selecting a logical layout.

FIG. 6 is a flowchart that illustrates an example of selecting a logical layout. The figure explains how specific criteria aid in the selection of the Logical Layout. It shows the most common situations and thus, does not deal with all possible situations. More detailed analysis is made for complex situations (for example, customers in both outsourcing and e-business hosting).

The selection process begins with a customer's data at Block 601. When the customer has data privacy, legal, or security requirements that cause the need for isolation, then at Decision 602, the "Yes" branch is taken to Decision 603. If the Customer has strict data privacy, security, and legal requirements, then, at a minimum, the customer should be in a Dedicated Spoke and PoD environment (605). Going further along this path, perhaps the customer should be in a Dedicated RIM, Spoke and PoD environment (606), or in an isolated and dedicated RIM, Spoke and PoD environment (607).

If on the other hand, the Customer does not have strict data privacy requirements, then at Decision 602, the "No" branch is taken to Decision 608. When the customer does not have unique IP addresses, the "No" branch is taken from Decision 608 to Block 609 (Non-unique IP addresses of the managed resources require a dedicated PoD and Spoke). If on the other hand, the Customer has unique IP addresses, the next decision is at Decision 610: is the customer is large enough to utilize 75% of the PoD server capacity? If so, the "Yes" branch is taken to Block 611 (shared spoke and dedicated POD).

At Decision 610, if the customer is not large enough to utilize 75% of the PoD server capacity, the "No" branch is taken to Decision 612. Then if the customer servers are not located in a service provider (such as IBM) location, the "No" branch is taken to Block 611 (shared spoke and dedicated POD). When the customer servers are located in a service provider (such as IBM) location, at Decision 612 the "Yes" branch is taken to Decision 613.

When the customer needs hardware isolation, at Decision 613 the "Yes" branch is taken to Block 611 (shared spoke and dedicated POD). If, on the other hand, the customer does not need hardware isolation, at Decision 613 the "No" branch is taken to Decision 614.

When the customer is in multiple locations, at Decision 614 the "Yes" branch is taken to Block 615 (shared spokes and shared POD's). If the same e-business hosting customer has resources in different farms separated by a WAN, then they should be in different e-business hosting PoD's. When the customer is not in multiple locations, the "No" branch is taken to Block 616 (shared spoke and shared POD).

In the example of FIG. 6 the following assumptions are made:

All servers for a customer are managed out of one support area. If the same customer is supported from multiple data centers then more research and planning is done to make sure there is one management point (RIM or Hub) for that customer.

The customer is placed in the appropriate PoD according to whether they are an e-business hosting or outsourcing customer.

This final portion of the detailed description presents a few details of a working example implementation, involving centralized management of geographically dispersed operations, utilizing IBM's Universal Management Infrastructure (UMI), and software products sold under the trademark TIVOLI by IBM. Preferably, communications flowed through the tiers, without skipping any tiers, to promote security. The hub had the highest security level. Components communicated with other components through web services technologies: hypertext transfer protocol (HTTP), extensible markup language (XML) and simple object access protocol (SOAP). Implementations for these web services technologies are freely available through the open-source software community. This example implementation provided much flexibility regarding whose premises were used for locating components. This example implementation was the basis for the simplified examples illustrated in FIG. 2 and FIG. 3B.

In conclusion, we have shown examples of architecture, systems, and methods for managing computing resources in a network.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A system, comprising:
a processor; and
a memory coupled to the processor, wherein the memory comprises instructions which, when executed by the processor, cause the processor to:
determine a level of data privacy associated with a user of the user resource;
responsive to the level of data privacy indicating a first level of dedicated computing resources, integrate the user resource into a first logical design that includes a shared regional infrastructure management (RIM) device, wherein the shared RIM device is shared between multiple user resources;
responsive to the level of data privacy indicating a second level of dedicated computing resources, integrate the user resource into a second logical design that includes a dedicated RIM device, wherein the dedicated RIM device is dedicated for use only by the user resource;
responsive to the user failing to require any level of data privacy, determine if the user resource has at least one associated unique Internet protocol (IP) address;
responsive to the user resource failing to have the at least one associated unique IP address, integrate the user resource into the first logical design;
responsive to the user resource having the at least one associated unique IP address, determine if the user resource utilizes a predefined percentage of a capacity of a point of deployment (POD) device; and
responsive to the user resource utilizing the predefined percentage of the capacity of the POD device, integrate the user resource into a third logical design that includes at least one shared hub, the shared RIM device, a shared spoke device, and a dedicated point of deployment (POD) device.

2. The system of claim 1, wherein the shared RIM device or the dedicated RIM device is coupled to a spoke device.

3. The system of claim 2, wherein the instructions further cause the processor to:
provide a secondary RIM device;
in case of a failure in the shred RIM device or the dedicated RIM device, connect the spoke to the secondary RIM device; and
employ the secondary RIM device to take over one or more functions of the shared RIM device or the dedicated RIM device.

4. The system of claim 1, wherein the instructions further cause the processor to:
distribute software via a hub master software package library in a shared hub to at least one of a RIM software repository in the shared RIM device, a RIM software repository in the dedicated RIM device, or a point of deployment (POD) software cache in the POD device, wherein the software is distributed to the RIM software repository in the shared RIM device or the dedicated RIM device via the hub master software package library and wherein the software is distributed to the POD software cache in the POD device via the RIM software repository.

5. The system of claim 4, wherein the instructions further cause the processor to:
distribute the software via a spoke software distribution host in a spoke device.

6. The system of claim 5, wherein the instructions further cause the processor to:
in ease of a failure of the RIM software repository, initiate software distribution to the POD software cache via the spoke software distribution host.

7. The system of claim 1, wherein the first logical design and the second logical design include at least one shared hub, a dedicated spoke device, and the dedicated POD device, wherein the dedicated spoke device and the dedicated POD device are dedicated for use only by the user resource.

8. The system of claim 1, wherein the instructions further cause the processor to:
responsive to the level of data privacy indicating a third level of dedicated computing resources, integrate the user resource into a fourth logical design that includes at least one shared hub, a isolated and dedicated RIM device, a dedicated spoke device, and the dedicated POD device, wherein the isolated and dedicated RIM device is dedicated to the customer resource and isolated from communication with other RIM devices.

9. The system of claim 1, wherein the instructions further cause the processor to:
  responsive to the user resource failing to utilize the predefined percentage of the capacity of the POD device, determine if the user associated with the user resource requires hardware isolation; and
  responsive to the user requiring hardware isolation, integrate the user resource into the third logical design.

10. The system of claim 9, wherein the user resource is a plurality of user resources and wherein the instructions further cause the processor to:
  responsive to the user failing to require hardware isolation, determine if the plurality of user resources are in multiple locations; and
  responsive to the plurality of user resources being in the multiple locations, integrate the user resource into a fourth logical design that includes the at least one shared hub, the shared RIM device, at least one shared spoke device, and at least one shared POD device.

11. The system of claim 9, wherein the user resource is a plurality of user resources and wherein the instructions further cause the processor to:
  responsive to the user failing to require hardware isolation, determine if the plurality of user resources are in multiple locations; and
  responsive to the plurality of user resources failing to be in the multiple locations, integrate the user resource into a fourth logical design that includes the at least one shared hub, the shred RIM device, the shared spoke device, and a shared POD device.

12. A computer program product comprising a computer recordable medium having a computer readable program recorded thereon, wherein the computer readable program, when executed on a computing device, causes the computing device to:
  determine a level of data privacy associated with a user of the user resource;
  responsive to the level of data privacy indicating a first level of dedicated computing resources, integrate the user resource into a first logical design that includes a shared regional infrastructure management (RIM) device, wherein the shared RIM device is shared between multiple user resources;
  responsive to the level of data privacy indicating a second level of dedicated computing resources, integrate the user resource into a second logical design that includes a dedicated RIM device, wherein the dedicated RIM device is dedicated for use only by the user resource;
  responsive to the user failing to require any level of data privacy, determine if the user resource has at least one associated unique Internet protocol (IP) address;
  responsive to the user resource failing to have the at least one associated unique IP address, integrate the user resource into the first logical design;
  responsive to the user resource having the at least one associated unique IP address, determine if the user resource utilizes a predefined percentage of a capacity of a point of deployment (POD) device; and
  responsive to the user resource utilizing the predefined percentage of the capacity of the POD device, integrate the user resource into a third logical design that includes at least one shred hub, the shred RIM device, a shared spoke device, and a dedicated point of deployment (POD) device.

13. The computer program product of claim 12, wherein the shared RIM device or the dedicated RIM device is coupled to a spoke device.

14. The computer program product of claim 13, wherein the computer readable program further causes the computing device to:
  provide a secondary RIM device;
  in case of a failure in the shared RIM device or the dedicated RIM device, connect the spoke to the secondary RIM device; and
  employ the secondary RIM device to take over one or more functions of the shared RIM device or the dedicated RIM device.

15. The computer program product of claim 12, wherein the computer readable program further causes the computing device to:
  distribute software via a hub master software package library in a shared hub to at least one of a RIM software repository in the shared RIM device, a RIM software repository in the dedicated RIM device, or a point of deployment (POD) software cache in the POD device, wherein the software is distributed to the RIM software repository in the shared RIM device or the dedicated RIM device via the hub master software package library and wherein the software is distributed to the POD software cache in the POD device via the RIM software repository.

16. The computer program product of claim 15, wherein the computer readable program further causes the computing device to:
  distribute the software via a spoke software distribution host in a spoke device.

17. The computer program product of claim 16, wherein the computer readable program further causes the computing device to:
  in case of a failure of the RIM software repository, initiate software distribution to the POD software cache via the spoke software distribution host.

18. The computer program product of claim 12, wherein the first logical design and the second logical design include at least one shared hub, a dedicated spoke device, and the dedicated POD device, wherein the dedicated spoke device and the dedicated POD device are dedicated for use only by the user resource.

19. The computer program product of claim 12, wherein the computer readable program further causes the computing device to:
  responsive to the level of data privacy indicating a third level of dedicated computing resources, integrate the user resource into a fourth logical design that includes at least one shared hub, a isolated and dedicated RIM device, a dedicated spoke device, and the dedicated POD device, wherein the isolated and dedicated RIM device is dedicated to the customer resource and isolated from communication with other RIM devices.

20. The computer program product of claim 12, wherein the computer readable program further causes the computing device to:
  responsive to the user resource failing to utilize the predefined percentage of the capacity of the POD device, determine if the user associated with the user resource requires hardware isolation; and
  responsive to the user requiring hardware isolation, integrate the user resource into the third logical design.

21. The computer program product of claim 20, wherein the user resource is a plurality of user resources and wherein the computer readable program further causes the computing device to:

responsive to the user failing to require hardware isolation, determine if the plurality of user resources are in multiple locations; and responsive to the plurality of user resources being in the multiple locations, integrate the user resource into a fourth logical design that includes the at least one shared hub, the shared RIM device, at least one shared spoke device, and at least one shared POD device.

22. The computer program product of claim 20, wherein the user resource is a plurality of user resources and wherein the computer readable program further causes the computing device to:

responsive to the user failing to require hardware isolation, determine if the plurality of user resources are in multiple locations; and responsive to the plurality of user resources failing to be in the multiple locations, integrate the user resource into a fourth logical design that includes the at least one shared hub, the shared RIM device, the shared spoke device, and a shared POD device.

\* \* \* \* \*